Nov. 14, 1967  J. F. ARENT  3,352,561
ADAPTER FOR RECORD CHANGER SPINDLE
Filed June 24, 1965  5 Sheets-Sheet 1
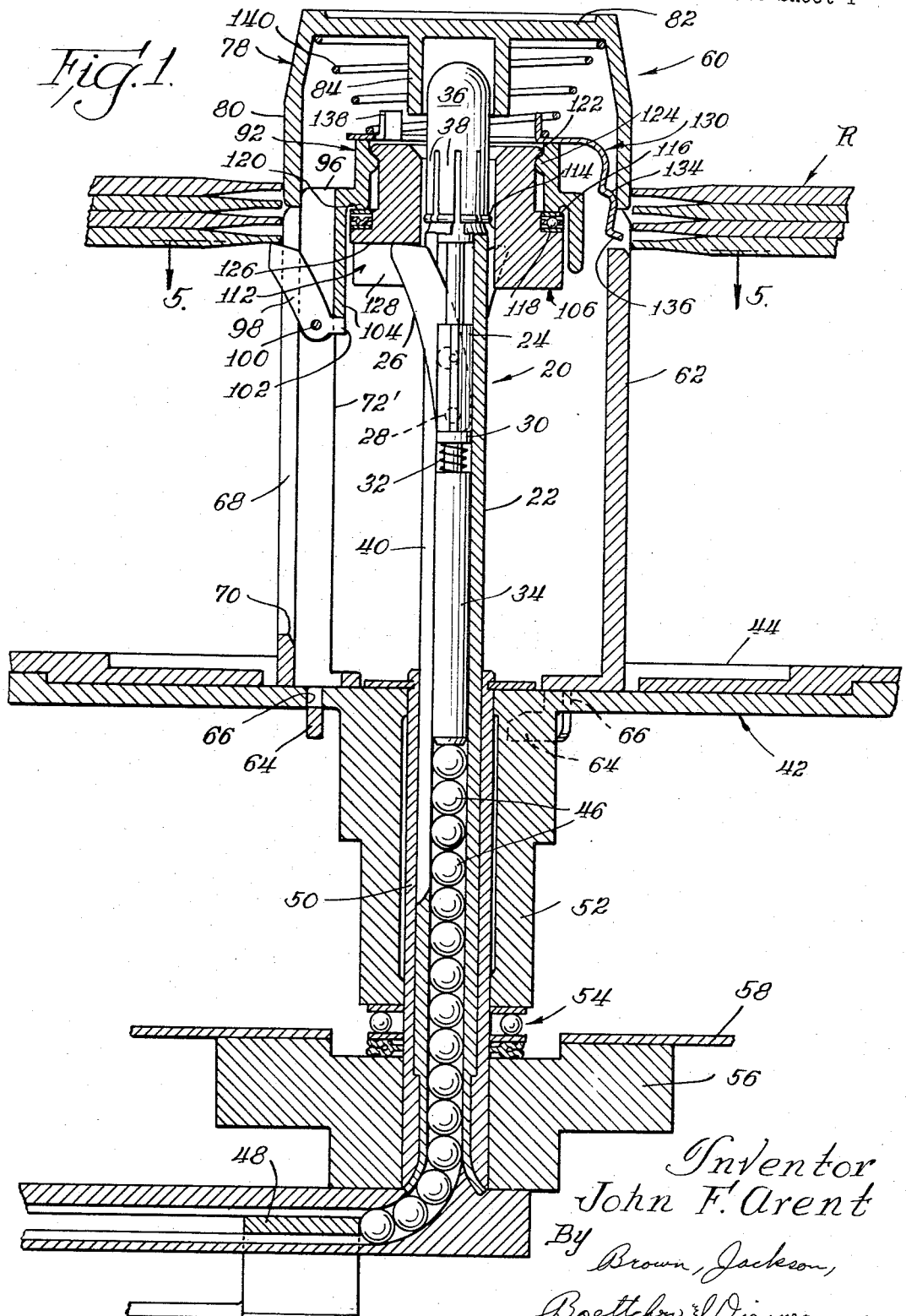

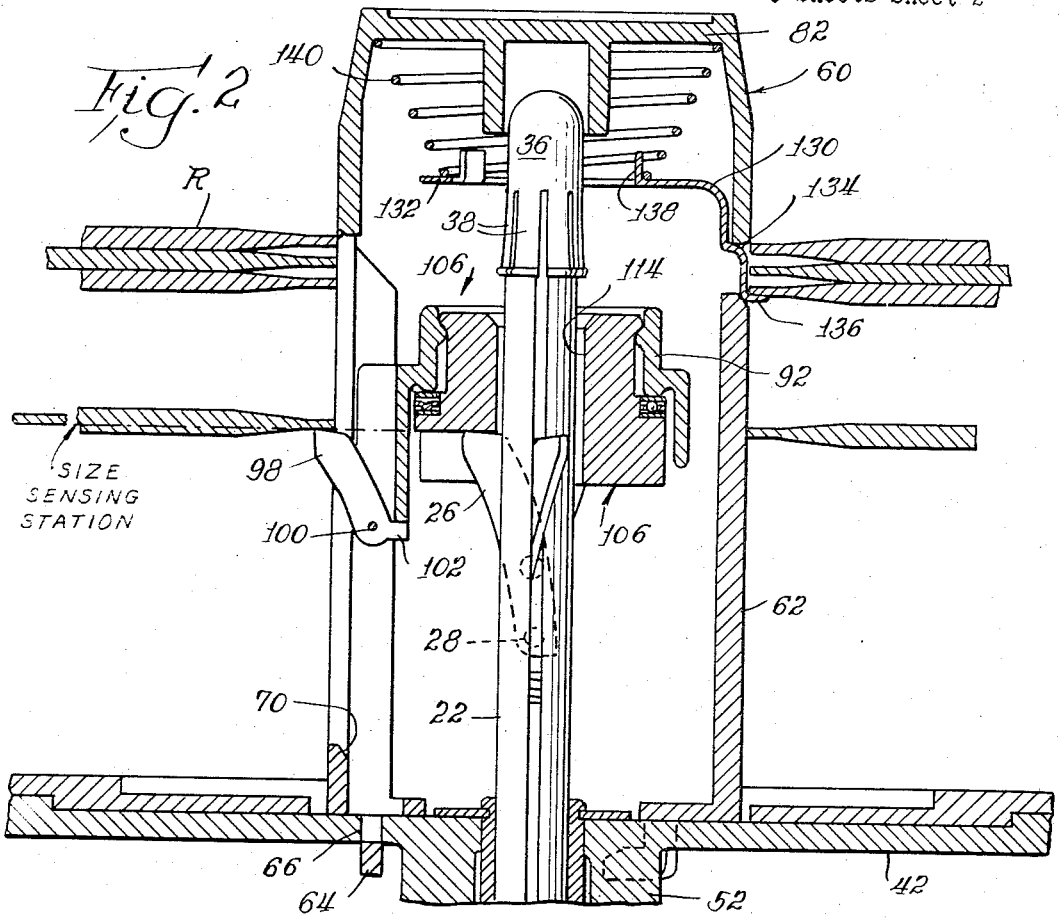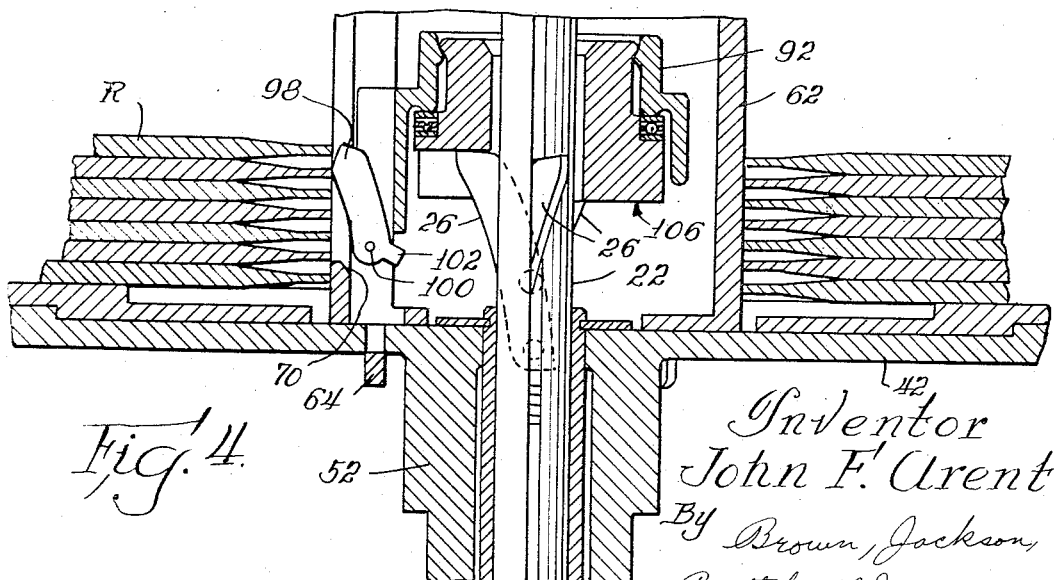

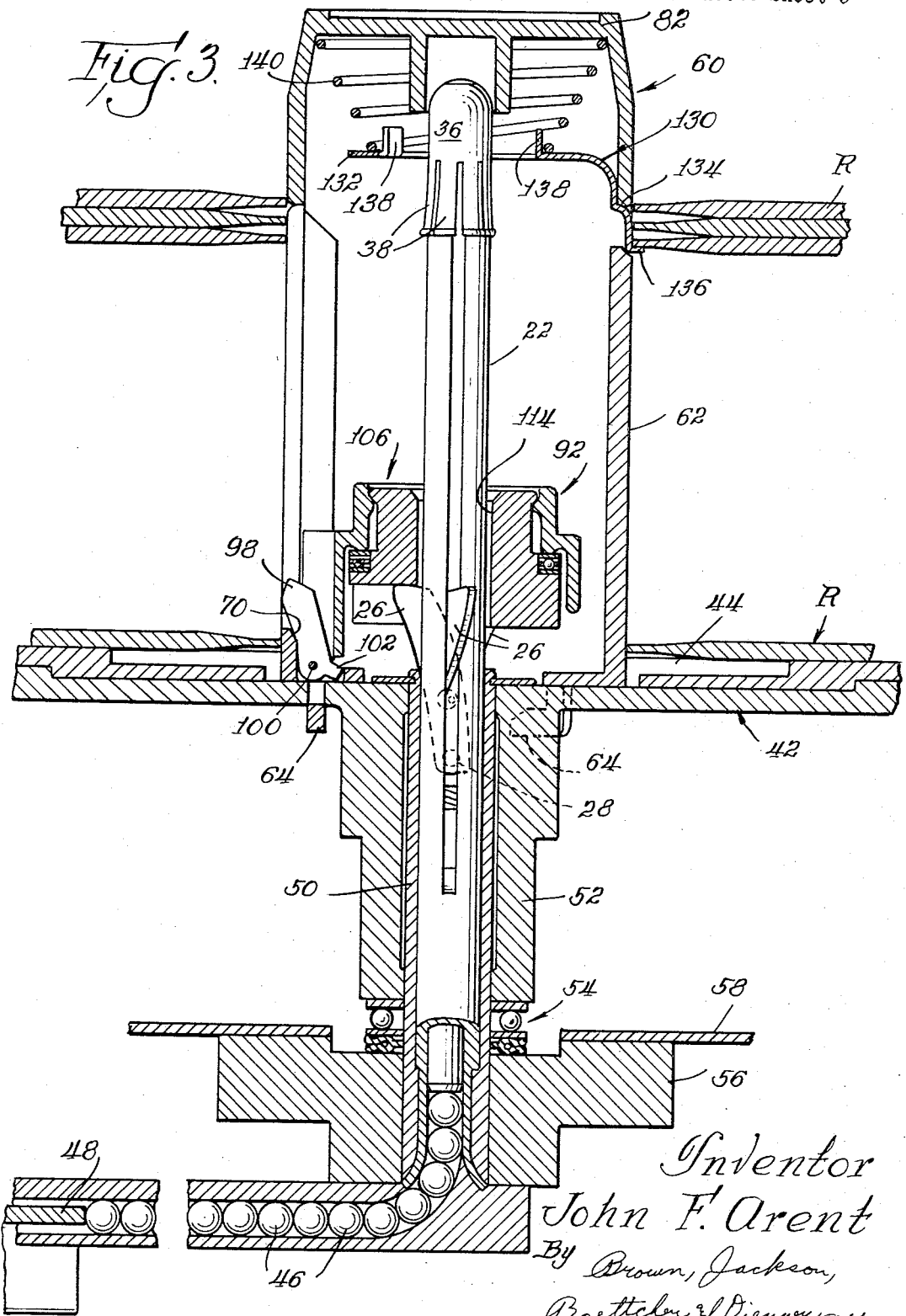

Nov. 14, 1967 J. F. ARENT 3,352,561
ADAPTER FOR RECORD CHANGER SPINDLE
Filed June 24, 1965 5 Sheets-Sheet 4
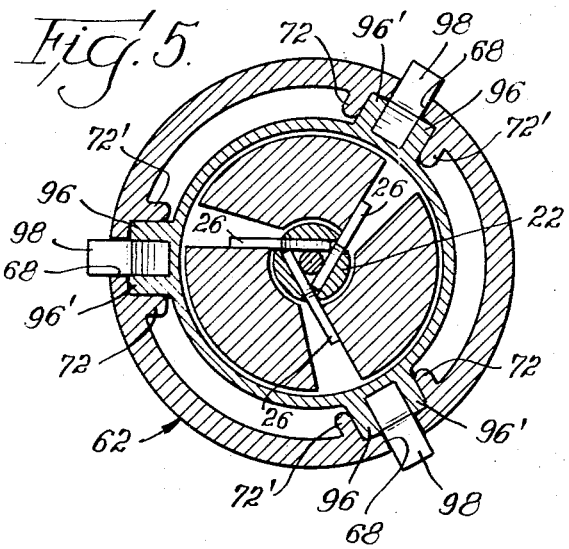
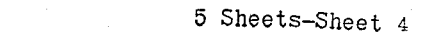
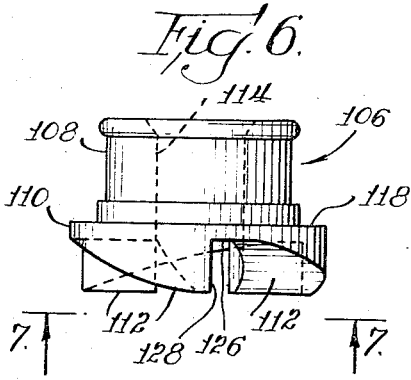
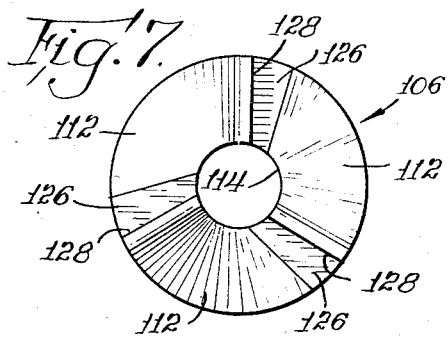
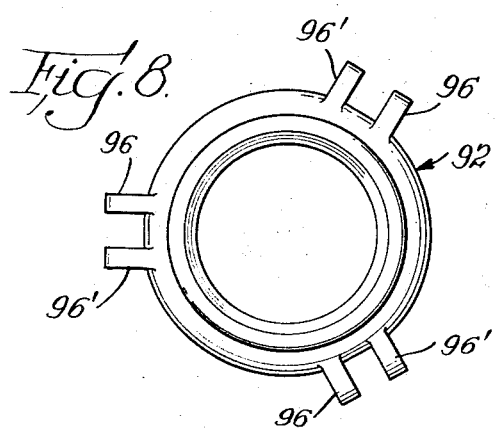
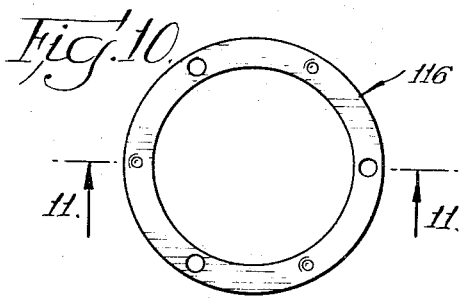
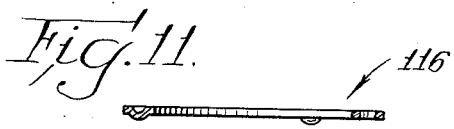
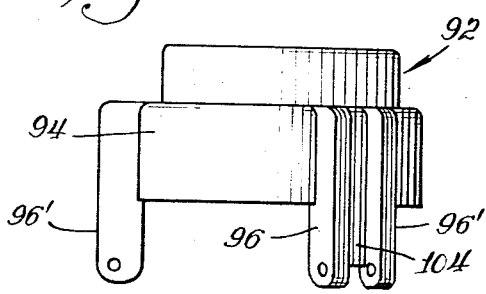
Inventor
John F. Arent
By Brown, Jackson,
Boettcher & Dienner
Attys.

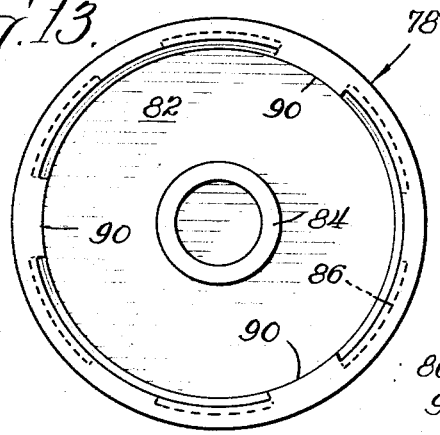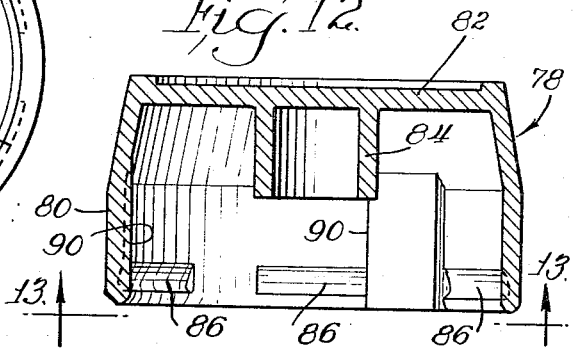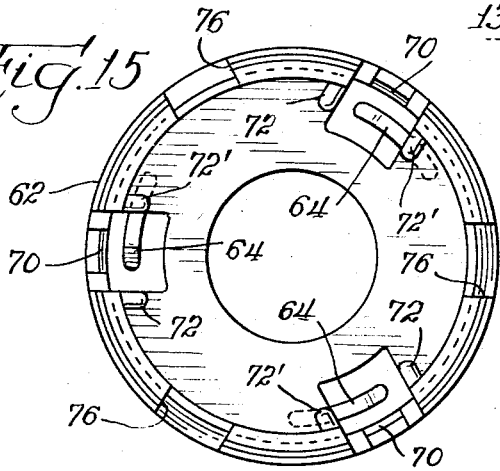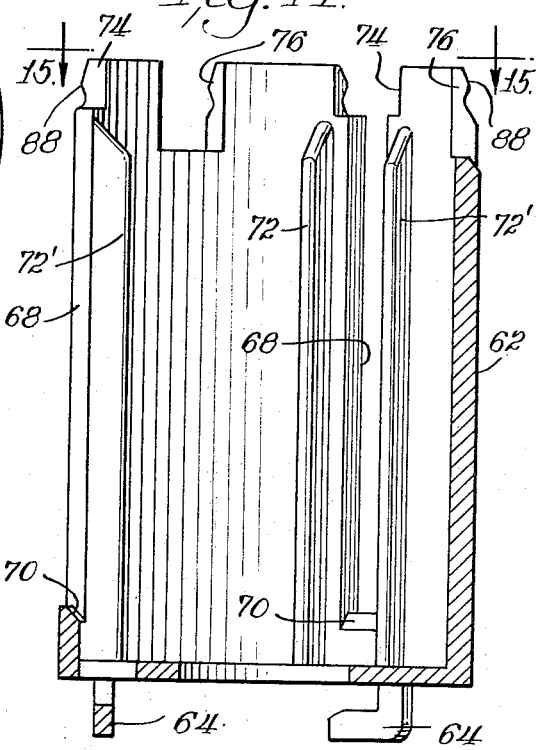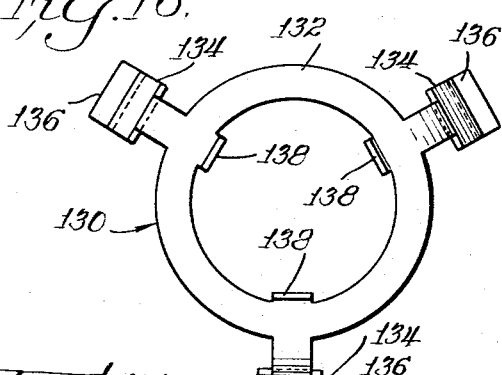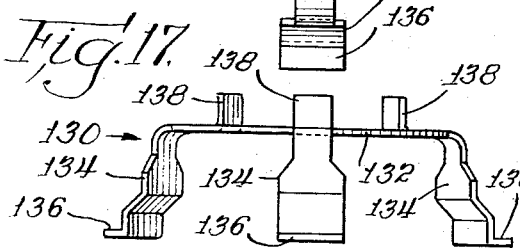
Inventor
John F. Arent
By Brown, Jackson,
Boettcher & Dienner
Att'ys United States Patent Office 3,352,561
Patented Nov. 14, 1967

3,352,561
ADAPTER FOR RECORD CHANGER SPINDLE
John F. Arent, Benton Harbor, Mich., assignor to V-M Corporation, Benton Harbor, Mich., a corporation of Michigan
Filed June 24, 1965, Ser. No. 466,761
18 Claims. (Cl. 274—10)

ABSTRACT OF THE DISCLOSURE

An adapter for mounting over and operation by a record changer spindle of the type having a plurality of record supporting fingers which normally extend outwardly through vertical slots formed in the spindle body and which move downwardly in the slots to lower one record at a time to a point near the turntable at which the spindle fingers are retracted to allow the record to come to rest on the turntable, the adapter having a body which fits overt he center spindle and removably locks to the port member slidably mounted within the adapter body turntable for rotation therewith, an adapter finger support and resting on the spindle fingers, the adapter body having a plurality of vertical slots and the adapter finger support member having fingers pivotally mounted therethrough which extend through the vertical slots in the adapter body such that the adapter fingers operate together with the center spindle supporting fingers to lower the bottom one of a stack of records to a point near the turntable where the adapter fingers are retracted either by engaging the centerhole edge of a record previously lowered to the turntable or by engaging the bottom edge of the vertical slots to release the record to the turntable, secondary means being utilized to support all but the lowermost record during its lowering during the record change cycle.

---

The present invention relates to an adapter designed to fit over a self-supporting record changer spindle to permit handling of records having a relatively large centerhole such as the 45 r.p.m. records commonly in use today.

The term "self-supporting spindle" is used to refer to a record changer center spindle of the type having a plurality of circumferentially spaced record supporting fingers which normally project outwardly through slots in a spindle body in order to support a stack of records without need of additional record stabilizing means, and which are adapted to be withdrawn into the spindle body in order to release a record to the turntable.

One particularly advantageous type of self-supporting spindle has been developed for lowering records one at a time from an upper storage portion of the spindle to the turntable without dropping the records. In the latter type of spindle the record suporting fingers normally extend outwardly through vertical slots in the spindle body, and such slots extend downwardly approximately to the level of the turntable. Thus, when the supporting fingers are lowered as a unit with one record supported thereon, the record is lowered substantially the entire distance to the turntable before the supporting fingers are cammed inwardly to retracted positions to withdraw their support from the record. A self-supporting spindle of the type which lowers a record to be played substantially the entire distance to the turntable is described in the copending application of Robert J. Hammond, Ser. No. 449,533, filed Apr. 20, 1965, and assigned to the assignee of the present invention.

It has long been known in the art to provide an adapter which fits over a record changer center spindle in order to accommodate 45 r.p.m. records of the type having a large diameter centerhole. However, such adapters have been designed for mounting over the conventional offset type center spindle where records are supported on a shelf formed on the spindle and are pushed off the shelf one at a time by an ejector member in order to drop them to the turntable. It has been customary to provide record feeding mechanism in the adapter which is actuated to drop a record by the ejector member in the small diameter center spindle when the adapter is mounted over the latter. On the other hand, the problem of providing an adapter which can be mounted over a self-supporting type spindle has never been satisfactorily solved.

Accordingly, it is an object of the present invention to provide an adapter which can be mounted over a self-supporting spindle in order to handle records of the type having a large centerhole.

Another object of the invention is to provide an adapter of the type last above-mentioned having record supporting means which is actuated by the record supporting fingers of the self-supporting center spindle when the latter are moved downwardly during a record change cycle.

A further object of the invention is to provide an adapter which is mounted over a self-supporting spindle of the type which lowers a record substantially the entire distance to the turntable, where the adapter itself is provided with record supporting means capable of lowering a large centerhole record substantially the entire distance to the turntable before releasing the same.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

In the drawings:

FIGURE 1 is a vertical sectional view showing an adapter constructed in accordance with the present invention mounted in operative position over a self-supporting center spindle, the record supporting mechanism of the adapter being shown in its normal at rest position to support a stack of records on an upper storage portion of the adapter;

FIGURE 2 is a fragmentary vertical sectional view similar to FIGURE 1 showing the record supporting mechanism of the adapter during a record change cycle as a record is being lowered under control to the turntable for playing;

FIGURE 3 is a vertical sectional view similar to FIGURE 1 showing the record supporting mechanism of the adapter at the bottom of its vertical stroke immediately after lowering a record substantially the entire distance to the turntable and releasing the same;

FIGURE 4 is a fragmentary vertical sectional view of the lower end of the adapter of FIGURE 1 showing the manner in which a record is released to the turntable by the adapter where several records are already disposed on the turntable, there being shown one of a plurality of adapter record supporting fingers which are cammed inwardly to retracted positions when they engage against the uppermost record on the turntable;

FIGURE 5 is a horizontal sectional view taken substantially along the line 5—5 of FIGURE 1;

FIGURE 6 is a detail elevational view of a finger bearing member which comprises one component of the adapter shown in FIGURE 1;

FIGURE 7 is a detail bottom plan view of the finger bearing member looking approximately in the direction of the arrows 7—7 of FIGURE 6 and showing three cam slopes which engage with the upper ends of the record supporting fingers of the self-supporting center spindle on which the adapter of the present invention is mounted;

FIGURE 8 is a detail top plan view of a finger support ring which comprises one component of the adapter of the present invention and serves to carry the record supporting fingers of the adapter;

FIGURE 9 is an elevational view of the finger support ring of FIGURE 8;

FIGURE 10 is a detail top plan view of a bearing retainer ring which comprises a component of a ball bearing mounted between the normally non-rotatable finger bearing of FIGURE 6 and the rotatable finger support ring of FIGURE 9 to reduce the friction therebetween;

FIGURE 11 is a sectional view taken along the line 11—11 of FIGURE 10;

FIGURE 12 is a detail vertical sectional view showing an adapter cap member comprising one component of the adapter of FIGURE 1;

FIGURE 13 is a bottom plan view of the adapter cap looking approximately in the direction of the arrows 13—13 of FIGURE 12;

FIGURE 14 is a detail vertical sectional view of an adapter body member having internal guide rails for guiding the finger support ring of FIGURE 9 as the latter moves vertically with the adapter body;

FIGURE 15 is a top plan view of the adapter body looking approximately in the direction of the arrows 15—15 of FIGURE 14;

FIGURE 16 is a detail top plan view of a finger blade member which comprises one component of the adapter and is utilized for supporting all but the bottom record of a stack on the upper storage portion of the adapter when the bottom record is being lowered to the turntable; and FIGURE 17 is an elevational view of the finger blade member of FIGURE 16.

Referring now to the drawings, FIGURE 1 shows a self-supporting center spindle 20 comprising a spindle body 22, a finger carrier 24 having three record supporting fingers 26 pivotally mounted thereon by pins 28, a collar 30 which is biased upwardly by a compression spring 32 to bias the fingers 26 to their outermost pivotal positions as shown in FIGURE 1, a center rod 34 which is vertically movable within the spindle body 22 to raise and lower the supporting fingers 26, and a cap 36 having a plurality of gripping fingers 38 which are expandable to support all but the bottom record in a stack on an upper storage portion of the center spindle 20 when the supporting fingers 26 are moved downwardly to lower the bottom record to the turntable. The supporting fingers 26 project outwardly through corresponding vertical slots 40 which are formed in the spindle body 22 and extend downwardly beneath the level of the turntable 42 which has a record supporting mat 44 mounted on its upper surface.

A plurality of steel balls 46 are disposed within the lower end of the center spindle body 22 beneath the center rod 34, and a movable actuator 48 acts on the last ball in the train of balls in order to move the latter upwardly or downwardly within the spindle body and thereby raise and lower the record supporting fingers 26. With respect to the mounting of the turntable 42, it will be seen that a sleeve bearing 50 surrounds the lower end of the spindle body 22, and a sleeve 52 which is integral with the turntable 42 is mounted over the sleeve bearing 50 and rests on a thrust ball bearing 54 disposed between the lower end of the turntable sleeve 52 and a mounting plate 56, the latter being secured to the underside of a subplate 58.

For a more complete description of the self-supporting center spindle 20, reference may be had to the copending application of Gerald H. Freier, Ser. No. 453,164, filed May 4, 1965, and assigned to the assignee of the present invention. In addition, for a more complete description of the structure and operation of the ball train 46 and actuator 48, reference may be had to the copending application of Robert J. Hammond, Ser. No. 449,533, filed Apr. 20, 1965, and assigned to the assignee of the present invention. It will be understood that the present invention is concerned with a 45 r.p.m. adapter which will be described hereinbelow, and the foregoing self-supporting center spindle 20 is described herein to provide one example of a self-supporting spindle of the type over which the adapter of the present invention is intended to be mounted.

FIGURE 1 shows an adapter 60 including an adapter body 62 which is a hollow generally cylindrical member having three locking lugs 64 which are integral with the lower end thereof and cooperate with respective slots 66 formed in the turntable 42 to permit the adapter body to be fixedly secured to the turntable for rotation therewith. Referring to FIGURES 1, 5 and 14, the adapter body 62 is provided with three circumferentially spaced vertical slots 68 which extend from the upper end of the body downwardly proximate the lower end thereof, the lower ends of such slots being defined by inclined surfaces 70 which are spaced only a short distance above the turntable record supporting mat 44 for reasons which will appear later herein.

A pair of internal ribs 72 and 72' are provided on opposite sides of each of the slots 68, such ribs being integral with the inside of the adapter body 62 so as to extend vertically in spaced apart parallel relation from adjacent the upper end of a corresponding vertical slot 68 to the lower end of the adapter body. Accordingly, with respect to each of the three vertical slots 68, there is a vertical rib or guide rail 72 on one side of the slot and a corresponding vertical ribs or guide rail 72' on the opposite side of the slot. FIGURE 14 further shows that the slots 68 widen out at their upper ends to form wider slot portions 74, the purpose of which will become clear hereinafter. The three vertical slots 68 are equally spaced apart 120 degrees, and intermediate the three slots 68 there are provided three openings or recesses 76 which extend downwardly from the extreme upper end of the adapter body 62 in order to accommodate record supporting blade members to be described later herein.

FIGURES 1 and 12 show an adapter cap member 78 which is snapped onto the upper end of the adapter body 62. The cap 78 is hollow and comprises a generally cylindrical side wall 80 and a top wall 82, the latter having a short tubular socket 84 depending downwardly therefrom to receive the extreme upper end 36 of the center spindle 20 when the adapter 60 is mounted in operative position over the center spindle. The interior of the cap wall 80 adjacent the lower edge thereof is provided with a plurality of spaced apart grooves 86 which cooperate with corresponding ribs 88 formed on the outside of the adapter body 62 adjacent the upper edge thereof. In addition, the side wall 80 of the adapter cap is provided with three circumferentially spaced ribs or thickened sections 90 which fit within the recesses or widened slot portions 74 formed in the adapter body 62. Accordingly, the adapter cap 78 may be assembled to the adapter body 62 by pressing the cap downwardly and snapping it into place on the upper end of the adapter body with the body ribs 88 disposed in the cap grooves 86 and with the cap ribs 90 disposed within the slot portions 74. In this manner, the cap 78 is firmly secured to the body 62 and prevented from rotating relative thereto.

Referring now to FIGURES 1, 5, 8 and 9, there is shown a finger support ring 92 comprising a body portion 94 on which are formed three spaced pairs of lugs. Each pair of lugs comprises a first lug 96 and a second lug 96' which extend generally vertically in spaced apart relation so as to project beneath the bottom of the body portion 94, and each pair of lugs has an adapter record supporting finger 98 pivotally supported therebetween by a pivot pin 100. As shown in FIGURE 1, each of the adapter supporting fingers 98 has a short leg 102 extending generally radially inwardly from the lower end thereof for engagement with the underside of a wall portion 104 which extends between each pair of lugs 96 and 96', such engagement preventing the fingers 98 from pivoting outwardly beyond the extreme outer position of FIGURE 1.

The finger support ring 92 is mounted within the adapter body 62 for vertical sliding movement therein, and as shown in FIGURE 5 the lugs 96 and 96' on the support ring fit between the guide rails 72 and 72' formed at the interior of the adapter body, while the adapter record supporting fingers 98 each project outwardly through a corresponding one of the vertical slots 68. The guide rails 72 and 72' thus extend vertically on both sides of each pair of lugs 96 and 96' to prevent relative rotation between the finger support ring 92 and the adapter body 62, while freely permitting the support ring to move vertically within the adapter body. It will thus be understood that when the adapter body 62 rotates the finger support ring 92, the torque developed between the two is taken out at the guide rails 72 and 72', thereby eliminating any appreciable rubbing between the fingers 98 and the sides of the vertical slots 68 so as to permit the fingers to move vertically in the slots and pivot on the pins 100 without interference.

Referring now to FIGURES 1, 6 and 7, there is shown a relatively heavy brass finger bearing 106 having an upper generally cylindrical body portion 108 and a lower increased diameter body portion 110, the latter having three spaced rotary cam slopes 112 formed on the underside thereof. The finger bearing 106 is provided with a central bore 114 through which the center spindle 20 projects so as to permit the bearing to slide vertically over the center spindle. The finger bearing has a roller bearing 116 mounted thereon at an annular shoulder 118 formed at the lower end of the upper cylindrical body portion 108, and the finger support ring 92 is provided with an annular rib 120 which rests on the bearing 116. Thus, the finger support ring 92 is mounted over the finger bearing 106 so as to surround the latter, and the support ring is disposed on the roller bearing 116 so as to be vertically supported by the finger bearing 106 while being free to rotate relative thereto. It will further be seen that the finger bearing 106 has an external annular rib 122 formed adjacent the upper end thereof which overlies an internal annular rib 124 formed adjacent the upper end of the finger support ring 92, and thus the finger support ring is prevented from moving vertically in either direction relative to the finger bearing 106.

The above-described three cam slopes 112 formed at the underside of the finger bearing 106 each extend to a respective uppermost cam track portion 126 which terminates at a vertical shoulder 128. The cam slopes 112 are intended to cooperate with the extreme upper ends of the center spindle record supporting fingers 26 when the adapter 60 is mounted over the center spindle. Thus, when the adapter 60 is first mounted over the center spindle 20, the finger bearing 106 will be supported on the upper ends of the fingers 26 with the latter in engagement with the three corresponding cam slopes 112. Such engagement will rotate the finger bearing 106 if necessary to permit the fingers 26 to assume the fully seated positions shown in FIGURE 1 where they engage against the uppermost cam track portions 126, thereby permitting the adapter 60 to assume its fully seated position wherein it may be locked to the turntable 42 by means of the locking lugs 64.

The purpose of providing the cam slopes 112 is to prevent the finger bearing 106 from being rotated due to any friction which might exist between the latter and the rotatable finger support ring 92, it being understood that any such continued rotation of the bearing 106 would produce undesirable wear on the upper surfaces of the fingers 26. Since any tendency for the finger bearing 106 to rotate is in a clockwise direction viewed from above, it will be noted that in the particular embodiment illustrated it is the slope of the cam surfaces 112 which prevents such rotation. If desired, the cam surfaces 112 may be reversed, in which case the vertical steps 128 will cooperate with the sides of the fingers 26 to prevent rotation of the finger bearing 106 in a more positive manner.

FIGURES 1, 16 and 17 show a finger blade member 130 comprising a flat ring or body portion 132 from which three circumferentially spaced blade fingers 134 depend. The downwardly extending blade fingers 134 each have a blade shelf 136 at the lower end thereof for engaging beneath the next-to-lowermost record in a stack in order to support all but the bottom record on an upper storage portion of the adapter 60 when the bottom record is being lowered to the turntable. There are also provided three tabs 138 which extend upwardly from the flat ring portion 132 adjacent the radially inner edge thereof. The finger blade member 130 is disposed in the lower end of the adapter cap 78 and is vertically movable therein between an upper inoperative position as shown in FIGURE 1 wherein the blade shelves 136 are retracted, and a lower operative position as shown in FIGURE 2 wherein the blade shelves 136 project outwardly through corresponding ones of the three openings 76 in the adapter body 62 so as to support all but the lowermost record in a stack of records disposed on the upper storage portion of the adapter.

A conical compression spring 140 is disposed above the blade member 130 so that the larger upper end of the spring bears against the top wall 82 of the adapter cap, while the smaller lower end surrounds the three upright tabs 138 and bears downwardly on the blade member to urge the latter toward its lower operative position of FIGURE 2. However, when the finger support ring 92 is in its uppermost position of FIGURE 1, the upper end thereof engages against the ring portion 132 of the blade member and holds the latter in its upper position wherein the blade fingers 134 are engaged against the lower end of the cap wall 80 and thereby maintained in retracted positions.

The operation of the foregoing adapter 60 will now be described. FIGURE 1 shows the self-supporting center spindle 20 in its normal at rest position with the supporting fingers 26 at the upper end of their stroke where they project outwardly through the slots 40 in the spindle body 22. The adapter 60 is operatively mounted over the upper end of the center spindle 20 so as to dispose the finger bearing 106 on the upper ends of the center spindle supporting fingers 26 with the latter seated against the uppermost cam track portions 126. If the cam track portions 126 are not initially aligned with the center spindle fingers 26, engagement of the latter with the cam slopes 112 will rotate the finger bearing 106 so as to produce the desired rotational alignment. The adapter 60 is moved fully downwardly over the center spindle 20 and is fixedly secured to the turntable 42 by positioning the adapter so that the locking lugs 64 thereon project through the corresponding slots 66 in the turntable, and thereafter rotating the adapter slightly.

When the center spindle supporting fingers 26 are disposed in their normal at rest positions as shown in FIGURE 1, the adapter finger bearing 106 which is supported on the fingers 26 will be disposed in its uppermost position, as will the finger support ring 92 which is vertically supported by the bearing 106. The upper end of the finger support ring 92 will engage against the blade member 130 and overcome the force of the spring 140 so as to maintain the blade member in its upper position with the blade shelves 136 retracted. The three adapter record supporting fingers 98 which are mounted on the support ring 92 will be disposed in their outermost pivotal positions due to gravity so as to project outwardly through corresponding ones of the three vertical slots 68 formed in the adapter body 62. Accordingly, a plurality of records R of the type having a large centerhole may be positioned over the upper end of the adapter 60 and supported on the adapter supporting fingers 98 as shown in FIGURE 1.

It will be understood that during operation of the associated record changer, the turntable 42 will be rotating, and of course the adapter body 62 which is locked to the turntable will rotate therewith. Moreover, the various other components of the adapter 60 including the blade member 130 and the finger support ring 92 will also rotate with the turntable, except for the finger bearing 106 which does not rotate. As previously explained, the finger support ring 92 is free to rotate relative to the finger bearing 106, and the latter will not rotate due to the cooperation between the upper ends of the center spindle fingers 26 and the cam slopes 112 at the underside of the bearing 106.

During a record change cycle, the center spindle fingers 26 are moved downwardly as illustrated in FIGURE 2, and due to the force of gravity the relatively heavy brass finger bearing 106 also moves downwardly, while remaining supported on the upper ends of the fingers 26. Consequently, the finger support ring 92, together with the adapter supporting fingers 98, moves downwardly with the finger bearing 106 under the control of the center spindle fingers 26. As soon as the finger support ring 92 begins to move downwardly away from the underside of the blade member 130, the compression spring 140 will move the blade member downwardly to the position of FIGURE 2 wherein the three blade shelves 136 will project radially outwardly through the openings 76 so as to extend beneath the centerhole edge of the next-to-lowermost record in the stack of records R supported on the adapter fingers 98. In this manner, the bottom record in the stack will be lowered on the adapter fingers 98, while the remainder of the stack will be supported on the blade shelves 136.

If desired, the center spindle fingers 26 may temporarily be stopped in the position of FIGURE 2 in order to permit a tone arm (not shown) or other sensing member to be swung inwardly into engagement with the record being lowered to sense the size thereof. Thereafter, the center spindle fingers 26 are moved further downwardly to the position of FIGURE 3. As previously explained, in the particular embodiment being described, the fingers 26 are controlled by the actuator 48 and ball train 46, and thus when the actuator 48 is moved to the left as viewed in FIGURE 1, the finger carrier 24, fingers 26, center rod 34 and balls 46 will all move downwardly within the spindle body 22 under the force of gravity.

As the adapter fingers 98 approach the position of FIGURE 3, they will first engage the surfaces 70 which define the lower ends of the vertical slots 68, and in this manner the fingers 98 will be pivoted to radially retracted positions to release the record previously supported thereon to the turntable. It will be seen that the lower end of each slot 68 terminates only a very short distance above the upper surface of the turntable record supporting mat 44, and thus the adapter supporting fingers 98 are not retracted until the record R has been lowered under control substantially the entire distance to the turntable.

It will be understood that if the center spindle 20 were being operated without the adapter 60 so as to handle records of the type having a small centerhole, the weight of the record being lowered on the center spindle fingers 26 would cause the latter to move further downwardly to positions wherein they were fully retracted within the spindle body 22. However, when the adapter 60 is being utilized, there is no supplemental downward force on the center spindle fingers 26 once the finger support ring 92 reaches the bottom of its stroke as shown in FIGURE 3, and since the weight of the fingers 26 and associated finger carrier 24 will not normaly be sufficient to carry them further downwardly, the fingers 26 will remain adjacent the cam slopes 112 at the underside of the finger bearing 106. It is important to note, however, that even if the center spindle fingers 26 should move further downwardly away from the finger bearing 106, when they are subsequently moved upwardly they will again seat against the uppermost cam track portions 126 at the underside of the finger bearing, and if any misalignment should be present they will rotate the bearing 106 in order to assume such a seated position.

As described above, when the first record to be played is lowered to the turntable 42, the adapter fingers 98 are cammed inwardly to retracted positions through engagement with the surfaces 70 at the lower ends of the slots 68. After several records have been lowered to the turntable for playing, the fingers 98 will then be cammed inwardly to their retracted positions when they engage the centerhole edge of the uppermost record previously disposed on the turntable. FIGURE 4 illustrates the manner in which the fingers 98 are retracted when a plurality of records are already positioned on the turntable 42, it being understood that the fingers 98 are not shown at their lowermost positions, and they will continue their downward movement until they reach the position of FIGURE 3.

After a record R to be played has been lowered under control to the turntable 42, the actuator 48 is moved to the right as viewed in FIGURE 3 so as to raise the center spindle fingers 26 and return them to the at rest position of FIGURE 1, thereby also returning the adapter fingers 98 to the position of FIGURE 1. When the finger support ring 92 approaches its uppermost position, it will engage the blade member 130 and move the latter upwardly against the force of the spring 140, thereby retracting the blade shelves 136. Thus, the entire record stack on the upper storage portion of the adapter will again be supported on the adapter fingers 98.

It will be seen from the foregoing that I have provided an adapter which is well suited for mounting over a self-supporting center spindle of the type having record supporting fingers which project outwardly through vertical slots in the spindle body, and that the operation of the adapter in lowering a record is controlled by the movement of the center spindle supporting fingers. It will further be seen that the adapter of the present invention is designed to handle records of the type having a large centerhole, and to lower such records one at a time substantially the entire distance to the turntable.

While I have illustrated my invention in a preferred form, I do not intend to be limited to that form, except insofar as the appended claims are so limited, since modifications coming within the scope of my invention will be readily suggested to others with my disclosure before them.

I claim:

1. For use with a record changer center spindle of the type having a plurality of spindle record supporting fingers which normally extend outwardly through openings in the spindle body and are movable downwardly from a normal upper record supporting position to release one record at a time to a turntable for playing, the improvement comprising an adapter which is mounted over said center spindle for handling records of the type having a large centerhole, said adapter including, in combination, an adapter body, an adapter finger support member mounted within said adapter body so as to be vertically slidable therein, a plurality of vertical openings in said adapter body, a plurality of adapter record supporting fingers mounted on said finger support member for vertical movement therewith, said adapter fingers being aligned with said vertical openings in said adapter body so that they normally project outwardly through said vertical openings to support a plurality of records on an upper storage portion of said adapter, and means associated with said finger support member for mounting the same on the upper ends of said center spindle record supporting fingers so as to be vertically supported thereon when said adapter is operatively mounted over said center spindle, said adapter fingers being retractably mounted on the finger supporting member whereby when said spindle fingers are lowered during a record change cycle said adapter fingers will be lowered therewith and be retracted into the adapter body to release one record to the turntable for playing.

2. The invention of claim 1 wherein said center spindle is of the type having vertical slots in the spindle body through which said spindle fingers project, and wherein said adapter body is provided with a plurality of vertical slots through which said adapter fingers project.

3. For use with a record changer center spindle of the type having a plurality of spindle record supporting fingers which normally extend outwardly through vertical slots whcih are formed in the spindle body and extend from an upper record storage portion of the spindle down at least approximately to the turntable, said fingers being movable from a normal upper record supporting position downwardly in said vertical slots to lower one record at a time substantially the entire distance to said turntable, the improvement comprising an adapter which is mounted over said center spindle for handling records of the type having a large centerhole, said adapter including, in combination, an adapter body, an adapter finger support member mounted within said adapter body so as to be vertically slidable therein, a plurality of vertical slots which are formed in said adapter body and extend from an upper record storage portion of the adapter down substantially the entire distance to the turntable, a plurality of adapter record supporting fingers mounted on said finger support member for vertical movement therewith, said adapter fingers being aligned with said vertical slots in said adapter body so that they normally project outwardly through said vertical slots to support a plurality of records on an upper storage portion of the adapter, said adapter fingers being retractable within said adapter body, and means associated with said finger support member for mounting the same on the upper ends of said center spindle record supporting fingers so as to be vertically supported thereon when said adapter is operatively mounted over said center spindle, and means retracting said adapter fingers within said adapter body whereby when said spindle fingers are lowered during a record change cycle said adapter fingers will move downwardly therewith to lower a record substantially the entire distance to the turntable and then release the record thereto.

4. The invention of claim 3 wherein said vertical slots in said adapter body terminate a short distance above the turntable whereby when said adapter fingers as they move downwardly approach said turntable they will engage the lower ends of said slots which constitute said retracting means and be cammed to retracted positions to release a record to the turntable.

5. For use with a record changer center spindle of the type having a plurality of spindle record supporting fingers which normally extend outwardly through vertical slots in the spindle body and are movable downwardly from a normal upper record supporting position to release one record at a time to a turntable for playing, the improvement comprising an adapter which is mounted over said center spindle for handling records of the type having a large centerhole, said adapter including in combination, an adapter body, an adapter finger support member mounted within said adapter body, interengaging vertical guide means formed on the inside of said adapter body and on the outside of said finger support member for preventing relative rotation between said finger support member and said adapter body while permitting said finger support member to slide vertically within said adapter body, a plurality of vertical slots in said adapter body, a plurality of adapter record supporting fingers retractably mounted on said finger support member for vertical movement therewith, said adapter fingers being aligned with said vertical slots in said adapter body so that they normally project outwardly through said vertical slots to support a plurality of records on an upper storage portion of said adapter, means associated with said finger support member for mounting the same on the upper ends of said center spindle record supporting fingers so as to be vertically supported thereon when said adapter is operatively mounted over said center spindle, and means for retracting said adapter means within the spindle body whereby when said spindle fingers are lowered during a record change cycle said adapter fingers will be lowered therewith and retracted to release one record to the turntable for playing.

6. For use with a record changer center spindle of the type having a plurality of spindle record supporting fingers which normally extend outwardly through vertical slots in the spindle body and are movable downwardly from a normal upper record supporting position to release one record at a time to a turntable for playing, the improvement comprising an adapter which is mounted over said center spindle for handling records of the type having a large centerhole, said adapter including, in combination, an adapter body, an adapter finger support member mounted within said adapter body so as to be vertically slidable therein, a plurality of vertical slots in said adapter body, a plurality of adapter record supporting fingers mounted on said finger support member for vertical movement therewith, said adapter fingers being aligned with said vertical slots in said adapter body so that they normally project outwardly through said vertical slots to support a plurality of records on an upper storage portion of said adapter, means associated with said finger support member for mounting the same on the upper ends of said center spindle record supporting fingers so as to be vertically supported thereon when said adapter is operatively mounted over said center spindle, said adapter fingers being retractable within said adapter body and means for retracting said adapter fingers within said adapter body during a record change cycle whereby when said spindle fingers are lowered during a record change cycle said adapter fingers will be lowered therewith and retracted to release one record to the turntable for playing, and a blade member disposed within the upper end of said adapter body and having a plurality of record supporting blade shelves for supporting all but the bottom record in a stack of records disposed on the upper storage portion of said adapter, said blade member being movable between an upper inoperative position wherein said blade shelves are retracted and a lower operative position wherein said blade shelves are radially extended outwardly of said adapted body, and said blade member being disposed above said finger support member so as to be engaged thereby and moved to its upper inoperative position when said finger support member is moved to the upper end of its vertical stroke.

7. The invention of claim 6 wherein a spring is mounted above said blade member to bias the latter downwardly toward its lower operative position, whereby when said finger support member is moved downwardly with said center spindle fingers during a record change cycle said blade shelves will be extended to support all but the lowermost record in the stack of records disposed on the upper storage portion of the adapter.

8. For use with a record changer center spindle of the type having a plurality of spindle record supporting fingers which normally extend outwardly through openings in the spindle body and are movable downwardly from a normal upper record supporting position to release one record at a time to a turntable for playing, the improvement comprising an adapter which is mounted over said center spindle for handling records of the type having a large centerhole, said adapter including, in combination, an adapter body, releasable locking means at the lower end of said adapter body for locking the same to the turntable for rotation therewith, an adapter finger support member mounted within said adapter body so as to rotate therewith and be vertically slidable therein, a plurality of vertical openings in said adapter body, a plurality of adapter record supporting fingers mounted on said finger support member for vertical movement and rotation therewith, said adapter fingers being aligned with said vertical openings in said adapter body so that they normally project outwardly through said vertical openings to support a plurality of records on an upper storage portion of said adapter and being retractable within said adapter body, and means associated with said finger support member for mounting the same on the upper ends of said center spindle record supporting fingers so as to be vertically supported thereon when said adapter is operatively mounted over said center spindle, and means for retracting said adapter fingers within said adapter body during a record change, whereby when said spindle fingers are lowered during a record change cycle said adapter fingers will be lowered therewith and retracted to release one record to the turntable for playing.

9. For use with a record changer center spindle of the type having a plurality of spindle record supporting fingers which normally extend outwardly through vertical slots which are formed in the spindle body and extend from an upper record storage portion of the spindle down at least approximately to the turntable, said fingers being movable from a normal upper record supporting position downwardly in said vertical slots to lower one record at a time substantially the entire distance to said turntable, the improvement comprising an adapter which is mounted over said center spindle for handling records of the type having a large centerhole, said adapter including, in combination, an adapter body, releasable locking means at the lower end of said adapter body for locking the same to the turntable for rotation therewith, an adapter finger support member mounted within said adapter body so as to rotate therewith and be vertically slidable therein, a plurality of vertical slots which are formed in said adapter body and extend from an upper record storage portion of the adapter down substantially the entire distance to the turntable, a plurality of adapter record supporting fingers mounted on said finger support member for vertical movement and rotation therewith, said adapter fingers being aligned with said vertical slots in said adapter body so that they normally project outwardly through said vertical slots to support a plurality of records on an upper storage portion of the adapter and being retractable within said adapter body, means for retracting said adapter fingers within said adapter body during a record change cycle, and means associated with said finger support member for mounting the same on the upper ends of said center spindle record supporting fingers so as to be vertically supported thereon when said adapter is operatively mounted over said center spindle, whereby when said spindle fingers are lowered during a record change cycle said adapter fingers will move downwardly therewith to lower one record substantially the entire distance to the turntable.

10. The invention of claim 9 wherein said vertical slots in said adapter body terminate a short distance above the turntable, whereby when said adapter fingers as they move downwardly approach said turntable they will engage the lower ends of said slots and be cammed to retracted positions to release a record to the turntable.

11. For use with a record changer center spindle of the type having a plurality of spindle record supporting fingers which normally extend outwardly through vertical slots in the spindle body and are movable downwardly from a normal upper record supporting position to release one record at a time to a turntable for playing, the improvement comprising an adapter which is mounted over said center spindle for handling records of the type having a large centerhole, said adapter including, in combination, an adapter body, releasable locking means at the lower end of said adapter body for locking the same to the turntable for rotation therewith, an adapter finger support member mounted within said adapter body, interengaging vertical guide means formed on the inside of said adapter body and on the outside of said finger support member for causing said finger support member to rotate with said adapter body while permitting said finger support member to slide vertically within said adapter body, a plurality of vertical slots in said adapter body, a plurality of adapter record supporting fingers mounted on said finger support member for vertical movement and rotation therewith, said adapter fingers being aligned with said vertical slots in said adapter body so that they normally project outwardly through said vertical slots to support a plurality of records on an upper storage portion of said adapter and being retractable within said adapter body, and means associated with said finger support member for mounting the same on the upper ends of said center spindle record supporting fingers so as to be vertically supported thereon when said adapter is operatively mounted over said center spindle and means for retracting said adapter fingers into said adapter body during a record change cycle, whereby when said spindle fingers are lowered during a record change cycle said adapter fingers will be lowered therewith and retracted to release one record to the turntable for playing.

12. For use with a record changer center spindle of the type having a plurality of spindle record supporting fingers which normally extend outwardly through openings in the spindle body and are movable downwardly from a normal upper record supporting position to release one record at a time to a turntable for playing, the improvement comprising an adapter which is mounted over said center spindle for handling records of the type having a large centerhole, said adapter including, in combination, an adapter body, releasable locking means at the lower end of said adapter body for locking the same to the turntable for rotation therewith, an adapter finger support member mounted within said adapter body so as to rotate therewith and be vertically slidable therein, a plurality of vertical openings in said adapter body, a plurality of adapter record supporting fingers mounted on said finger support member for vertical movement and rotation therewith, said adapter fingers being aligned with said vertical openings in said adapter body so that they normally project outwardly through said vertical openings to support a plurality of records on an upper storage portion of said adapter and being retractable within said adapter body, means for retracting said adapter fingers into said adapter body during a record change cycle, and a finger bearing member having a central opening which permits the same to pass over the upper end of said center spindle and come to rest on the upper ends of said center spindle record supporting fingers when said adapter is operatively mounted over said center spindle, said finger support member being mounted on said finger bearing so as to be rotatable relative to said finger bearing while being vertically supported thereby, whereby when said spindle fingers are lowered during a record change cycle said adapter fingers will be lowered therewith and retracted to release one record to the turntable for playing.

13. The invention of claim 12 wherein said finger support member and said finger bearing are interconnected so that said finger support member cannot move vertically either up or down relative to said finger bearing but remains free to rotate relative to said finger bearing.

14. The invention of claim 12 wherein means is formed at the underside of said finger bearing member for engagement with the upper ends of said spindle supporting fingers to prevent said finger bearing member from rotating relative to said spindle fingers.

15. For use with a record changer center spindle of the type having a plurality of spindle record supporting fingers which normally extend outwardly through vertical slots in the spindle body and are movable downwardly from a normal upper record supporting position to release one record at a time to a turnable for playing, the improvement comprising an adapter which is mounted over said center spindle for handling records of the type having a large centerhole, said adapter including, in combination, an adapter body, releasable locking means at the lower end of said adapter body for locking the same to the turntable for rotation therewith, an adapter finger support member mounted within said adapter body, interengaging vertical guide means formed on the inside of said adapter body and on the outside of said finger support member for causing said finger support member to rotate with said adapter body while permitting said finger support member to slide vertically within said adapter body, a plurality of vertical slots in said adapter body, a plurality of adapter record supporting fingers mounted on said finger support member for vertical movement and rotation therewith, said adapter fingers being aligned with said vertical slots in said adapter body so that they normally project outwardly through said vertical slots to support a plurality of records on an upper storage portion of said adapter and being retractable within said adapter body, means for retracting said adapter fingers within said adapter body during a record change cycle, and a finger bearing member having a central opening which permits the same to pass over the upper end of said center spindle and come to rest on the upper ends of said center spindle record supporting fingers when said adapter is operatively mounted over said center spindle, said finger support member being mounted on said finger bearing so as to be rotatable relative to said finger bearing while being vertically supported thereby, whereby when said spindle fingers are lowered during a record change cycle said adapter fingers will be lowered therewith and retracted to release one record to the turntable for playing.

16. For use with a record changer center spindle of the type having a plurality of spindle record supporting fingers which normally extend outwardly through vertical slots which are formed in the spindle body and extend from an upper record storage portion of the spindle down at least approximately to the turntable, said fingers being movable from a normal upper record supporting position downwardly in said vertical slots to lower one record at a time substantially the entire distance to said turntable, the improvement comprising an adapter which is mounted over said center spindle for handling records of the type having a large centerhole, said adapter including in combination, an adapter body, an adapter finger support member mounted within said adapter body so as to be vertically slidable therein, a plurality of vertical slots which are formed in said adapter body and extend from an upper record storage portion of the adapter down substantially the entire distance to the turntable, a plurality of adapter record supporting fingers pivotaly mounted on said finger support member for vertical movement therewith, said adapter fingers being aligned with said vertical slots in said adapter body so that they normally project outwardly through said vertical slots to support a plurality of records on an upper storage portion of the adapter, and means associated with said finger support member for mounting the same on the upper ends of said center spindle record supporting fingers so as to be vertically supported thereon when said adapter is operatively mounted over said center spindle, whereby when said spindle fingers are lowered during a record change cycle said adapter fingers will move downwardly therewith to lower one record substantially the entire distance to the turntable, said vertical slots in said adapter body terminating a short distance above the turntable such that when said adapter fingers as they move downwardly approach said turntable they will engage the lower ends of said slots and be cammed to retracted positions to release a record to the turntable.

17. For use with a record changer center spindle of the type having a plurality of spindle record supporting fingers which normally extend outwardly through vertical slots in the spindle body and are movable downwardly from a normal upper record supporting position to release one record at a time to a turnable for playing, the improvement comprising an adapter which is mounted over said center spindle for handling records of the type having a large centerhole, said adapter including, in combination, an adapter body, releasable locking means at the lower end of said adapter body for locking the same to the turntable for rotation therewith, an adapter finger support member mounted within said adapter body, interengaging vertical guide means formed on the inside of said adapter body and on the outside of said finger support member for causing said finger support member to rotate with said adapter body while permitting said finger support member to slide vertically within said adapter body, a plurality of vertical slots in said adapter body, a plurality of adapter record supporting fingers pivotally mounted on said finger support member for vertical movement and rotation therewith, said adapter fingers being aligned with said vertical slots in said adapter body so that they normally project outwardly through said vertical slots to support a plurality of records on an upper storage portion of said adapter and a finger bearing member having a central opening which permits the same to pass over the upper end of said center spindle and come to rest on the upper ends of said center spindle record supporting fingers when said adapter is operatively mounted over said center spindle, said finger support member being mounted on said finger bearing so as to be rotatable relative to said finger bearing while being vertically supported thereby, whereby when said spindle fingers are lowered during a record change cycle said adapter fingers will be lowered therewith to release one record to the turntable for playing, said vertical slots in said adapter body terminating a short distance above the turntable whereby when said adapter fingers, as they move downwardly, approach said turntable they will engage the lower ends of said slots and be pivoted to retracted positions to release a record to the turntable.

18. The invention of claim 17 wherein means is formed at the underside of said finger bearing member for engagement with the upper ends of said center spindle supporting fingers to prevent said finger bearing member from rotating relative to said spindle fingers.

No references cited.

LEONARD FORMAN, *Primary Examiner.*

HARRY N. HAROIAN, *Examiner.*